(12) United States Patent
Bennett

(10) Patent No.: US 12,382,147 B2
(45) Date of Patent: Aug. 5, 2025

(54) ENCODING INPUT FOR MACHINE LEARNING

(71) Applicant: Sony Interactive Entertainment Inc., Tokyo (JP)

(72) Inventor: Matthew Bennett, Draper, UT (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/222,605

(22) Filed: Jul. 17, 2023

(65) Prior Publication Data

US 2023/0362458 A1 Nov. 9, 2023

Related U.S. Application Data

(63) Continuation of application No. 16/177,136, filed on Oct. 31, 2018, now Pat. No. 11,706,499.

(51) Int. Cl.

| | |
|---|---|
| *G06F 17/00* | (2019.01) |
| *A63F 13/245* | (2014.01) |
| *G06F 16/68* | (2019.01) |
| *G06F 16/78* | (2019.01) |
| *G06F 18/214* | (2023.01) |

(Continued)

(52) U.S. Cl.
CPC ....... *H04N 21/8358* (2013.01); *A63F 13/245* (2014.09); *G06F 16/68* (2019.01); *G06F 16/78* (2019.01); *G06F 18/214* (2023.01); *G06N 3/08* (2013.01); *G06V 10/776* (2022.01); *H04N 21/242* (2013.01)

(58) Field of Classification Search
CPC ............ H04N 21/8358; H04N 21/242; H04N 21/233; H04N 21/234; H04N 21/235; A63F 13/245; A63F 13/215; A63F 13/54; A63F 13/67; A63F 13/69; G06F 16/68; G06F 16/78; G06F 18/214; G06N 3/08; G06N 3/044; G06N 3/045; G06N 3/048; G06V 10/776
USPC ......................................... 706/25
See application file for complete search history.

(56) References Cited

U.S. PATENT DOCUMENTS

| | | |
|---|---|---|
| 9,648,282 B2 | 5/2017 | Petrovic et al. |
| 10,022,634 B2 | 7/2018 | Kao et al. |

(Continued)

FOREIGN PATENT DOCUMENTS

| | | |
|---|---|---|
| JP | 2015232916 A | 12/2015 |
| JP | 2016031669 A | 3/2016 |
| JP | 2018099817 A | 6/2018 |

OTHER PUBLICATIONS

"Wikipedia—Digital Watermarking" Wikipedia.org Sep. 8, 2015, Available at: https://en.wikipedia.org/w/index.php?title=Digital_watermarking&oldid=680058129 Accessed on Jan. 15, 2015.

(Continued)

*Primary Examiner* — Paul C McCord
(74) *Attorney, Agent, or Firm* — Kilpatrick Townsend & Stockton LLP

(57) ABSTRACT

A method and system for providing synchronized input feedback, comprising receiving an input event, encoding the input event in an output stream wherein the encoding of the input event is synchronized to a specific event and reproducing the output stream through an output device whereby the encoded input event in the reproduced output stream is imperceptible to the user.

20 Claims, 6 Drawing Sheets

(51) Int. Cl.
*G06N 3/08* (2023.01)
*G06V 10/776* (2022.01)
*H04N 21/242* (2011.01)
*H04N 21/8358* (2011.01)

(56) References Cited

U.S. PATENT DOCUMENTS

| | | | |
|---|---|---|---|
| 2004/0005093 A1* | 1/2004 | Rhoads | H04N 1/32144 |
| | | | 704/E19.009 |
| 2006/0068917 A1 | 3/2006 | Snoddy et al. | |
| 2008/0261693 A1* | 10/2008 | Zalewski | A63F 13/213 |
| | | | 463/31 |
| 2009/0043172 A1* | 2/2009 | Zagorchev | A61B 6/508 |
| | | | 600/300 |
| 2011/0068898 A1* | 3/2011 | Petrovic | G06F 7/00 |
| | | | 340/5.86 |
| 2012/0197764 A1 | 8/2012 | Nuzzi et al. | |
| 2013/0014136 A1 | 1/2013 | Bhatia et al. | |
| 2015/0242983 A1 | 8/2015 | DiGiovanni | |
| 2016/0227228 A1 | 8/2016 | Pomeroy et al. | |
| 2017/0087475 A1* | 3/2017 | Perry | A63F 13/25 |
| 2017/0113136 A1 | 4/2017 | Marr et al. | |
| 2017/0246544 A1 | 8/2017 | Agarwal et al. | |
| 2018/0342256 A1 | 11/2018 | Huffman et al. | |
| 2019/0228312 A1* | 7/2019 | Andoni | G06F 18/2433 |
| 2020/0134447 A1 | 4/2020 | Bennett | |
| 2020/0311239 A1 | 10/2020 | Sardari et al. | |
| 2021/0050025 A1 | 2/2021 | Huffman et al. | |

OTHER PUBLICATIONS

"Wikipedia—Steganography" Wikipedia.org, Nov. 21, 2016, Retrieved from: https://en.wikipedia.org/w/index.php?title=Steganography&oldid=750696756 Accessed: Jul. 14, 2017.

European Complete Search Report for Application No. 19878275.7, dated Nov. 11, 2022.

International Search Report and Written Opinion dated Dec. 31, 2019 for International Patent Application Number PCT/US2019/053624.

Japanese Office Action for Country Code Application No. 2021-523882, dated Jun. 20, 2022.

Non-Final Office Action for U.S. Appl. No. 16/177,136, dated May 25, 2022.

Notice of Allowance for U.S. Appl. No. 16/177,136, dated Mar. 6, 2023.

Partial European Search Report for Country Code Application No. 19878275.7, dated Aug. 1, 2022.

* cited by examiner

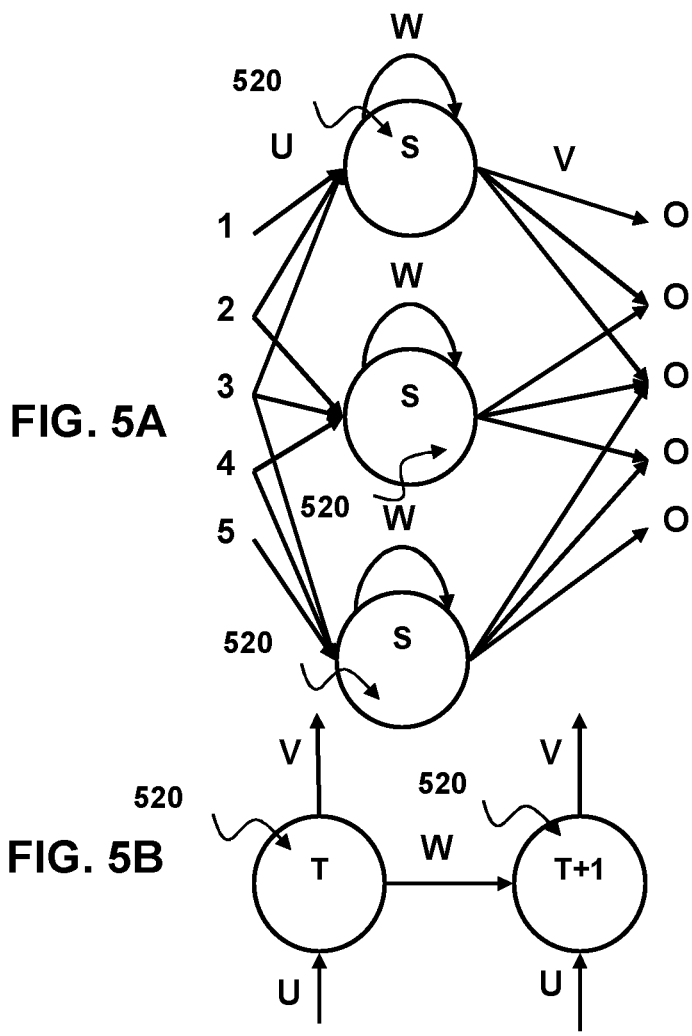
FIG. 5A
FIG. 5B
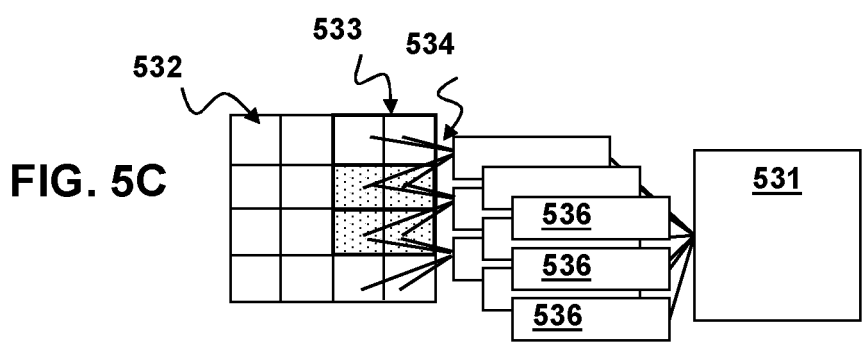
FIG. 5C

ENCODING INPUT FOR MACHINE LEARNING

CLAIM OF PRIORITY

This application is a continuation of U.S. patent application Ser. No. 16/177,136 filed Oct. 31, 2018, the entire contents of which are incorporated herein by reference.

FIELD OF THE DISCLOSURE

The present disclosure relates to producing datasets for machine learning. Specifically, the present disclosure relates producing datasets with synchronized input feedback for training neural networks.

BACKGROUND OF THE INVENTION

Quality assurance and release testing of software typically requires several people working many days to discover bugs and ensure that content meets quality standards. Machine learning has been proposed as a way to reduce the amount of workers and time required to perform the quality assurance and release testing tasks. A current difficulty in using machine learning for this field is that training the machines requires workers to repeat the testing procedure a huge number of times while the machine is receiving tester inputs.

It is within this context that embodiments of the present disclosure arise.

BRIEF DESCRIPTION OF THE DRAWINGS

The aspects of the present disclosure can be readily understood by considering the following detailed description in conjunction with the accompanying drawings, in which:

FIG. 5A is a simplified node diagram of a recurrent neural network for use in a system having synchronized input feedback according to aspects of the present disclosure.

FIG. 5B is a simplified node diagram of an unfolded recurrent neural network use in a system having synchronized input feedback according to aspects of the present disclosure.

FIG. 5C is a simplified diagram of a convolutional neural network for use in a system having synchronized input feedback according to aspects of the present disclosure.

DESCRIPTION OF THE SPECIFIC EMBODIMENTS

Figure 1:
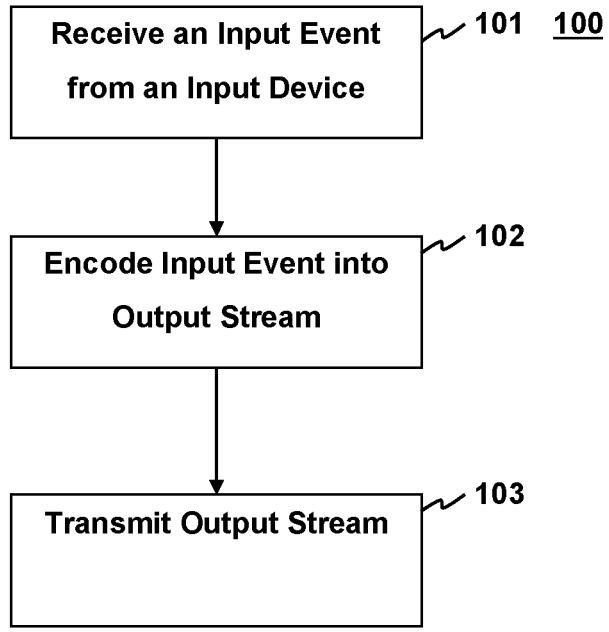
FIG. 1 depicts a block diagram of the method for synchronizing input feedback according to aspects of the present disclosure.

Although the following detailed description contains many specific details for the purposes of illustration, anyone of ordinary skill in the art will appreciate that many variations and alterations to the following details are within the scope of the disclosure. Accordingly, examples of embodiments of the disclosure described below are set forth without any loss of generality to, and without imposing limitations upon, the claimed disclosure.

While numerous specific details are set forth in order to provide a thorough understanding of embodiments of the disclosure, it will be understood by those skilled in the art that other embodiments may be practiced without these specific details. In other instances, well-known methods, procedures, components and circuits have not been described in detail so as not to obscure the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. In some instances, "connected", "connection", and their derivatives are used to indicate a logical relationship, e.g., between node layers in a neural network (NN). "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

Currently training artificial agents for video game and other software testing requires many workers performing and repeating testing protocols to generate a sufficient amount of training data. Synchronization is major issue, with the current methods all training must be performed live with the machine-learning algorithm receiving tester inputs while the tester is performing their testing protocol. Testing cannot be performed on recorded testing performances because there is currently no way for the machine to synchronize input from the user with specific events occurring within the software environment. Thus, aspects of present disclosure aim to create a system and method for encoding the input events from the user into an output stream so that machine learning will be able to synchronize inputs with specific events occurring in the software environment. In some implementations, synchronization of timing of the inputs with the resulting output can be greatly simplified by combining the input and output timing information into a single output file.

Input Feedback Mechanism

FIG. 1 depicts a method for synchronizing input feedback according to aspects of the present disclosure. The method begins with reception of an input event from an input device 101. The input event may be a button press, joystick input, analog joy pad input, steering wheel input, potentiometer input or the like. In some implementations, input event is synchronized with a specific event occurring within a software environment. In some cases, the specific event is an output event or series of output events in an output stream. For example and without limitation in a videogame, a key press (an input event) may be synchronized to precede an action by an avatar within the game (a specific event). As another example, in a music player, the movement of a potentiometer (an input event) may precede amplitude increases (a specific event). Synchronization of an input event with a specific event or events is important for testing some applications such as video games and user interfaces because a malfunctioning application may show incorrect behavior, long dwell times or no response to key presses. The input event is then encoded into an output stream 102. The output stream may include an Audio stream, video stream, etc. During encoding 102, the synchronization between the input event and the specific event should be maintained within the output stream. By way of example and not by way of limitation for a videogame, an input event that precedes an action of an avatar in the video stream is placed at a time in the audio stream of the video game before the actions of the avatar occurs. In this example, the audio stream and video stream are synchronized which is commonplace in most types of multimedia presentations. An output device may then reproduce the output stream with the encoded input and transmit it, as indicated at 103. By way of example, and not by way of limitation, the output device may be a speaker, a display screen, or a television screen. The encoded input embedded in the output stream during reproduction at 103 is undetectable or at least imperceptible to the user when reproduced by the output device, where the user is a human being with average vision and hearing faculties.

Figure 2A:
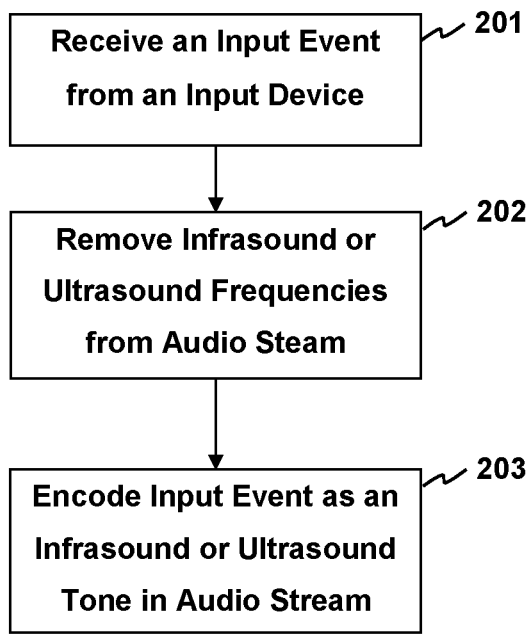
FIG. 2A shows a block diagram of the method for synchronizing input feedback with an audio output stream according to aspects of the present disclosure.
Figure 4:
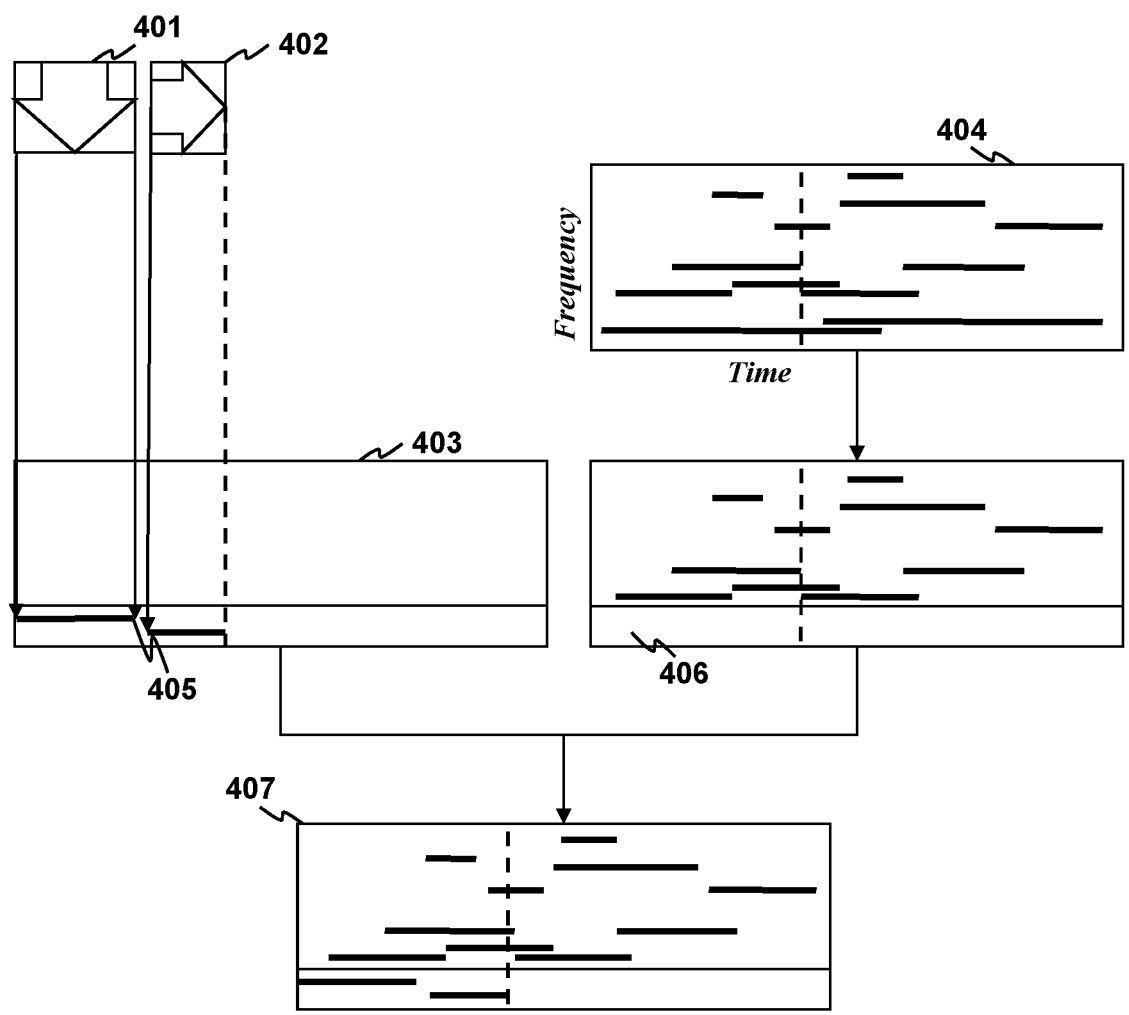
FIG. 4 shows diagram of the method for synchronizing input feedback with an audio output stream according to aspects of the present disclosure.

FIG. 2A and FIG. 4 shows the method for synchronizing input feedback with an audio output stream. The input event 401, 402 is received 201 from an input device. As discussed above during most multimedia presentations the audio streams 404 and video streams are synchronized. As such, specific events occurring in either the video output stream or the audio output stream can be synchronized with encoded input events placed at the appropriate time in the either output stream. A benefit of the encoding the input event in the audio stream is the comparatively high sample rate of audio output streams to video output streams. During encoding, either the lower frequency portion 406 or upper frequency portion of the audio stream is removed 202 by applying either a high pass or low pass frequency filter. The Lower frequency portion of the audio stream corresponds to infrasound that is, sound vibrations below 20 Hz. The upper frequency portion of the audio stream corresponds to ultrasound that is, sound vibrations above 20 kHz. In general, infrasound and ultrasounds are undetectable to adult humans or at least imperceptible. The input event may be converted to an audio tone 403, which is then mixed into the audio stream 203, 407 by addition in the frequency domain and division of the total by the total number of sound frequencies added together at each time step as shown in Eq 1. Where $f(a)$ is the frequency of the output stream at time step t and $f(b_{1...n})$ represents the encoded tone and n represents the number of tones, $$[(f(a)+f(b_1)+\ldots f(b_n))/(n+1)]_t \qquad \text{Eqn 1.}$$

As shown in FIG. 4 the length the button presses 401, 402 may be encoded by the length of tones 406. Each type of button press may be encoded as a different frequency tone. The output audio stream with the encoded tones may be decomposed, e.g., by Fourier transform and analyzed to determine the presence of the input tones. Where the output audio stream is synchronized to an output video stream the synchronized audio and video streams may be saved to a single output file, which greatly simplifies timing between the input events and specific output events. In the example shown, a down arrow button press 401 may be encoded at a higher frequency tone 406 than a right arrow button press 402 and between the button presses no tone is encoded. During playback, the tones encoded into the audio data are undetectable to the user but are decodable for use by neural networks. Specifically, according to aspects of the present disclosure, neural networks may use information decoded from the tones to determine which specific events that occur during game play are associated with input events associated with the encoded tones.

Figure 2B:
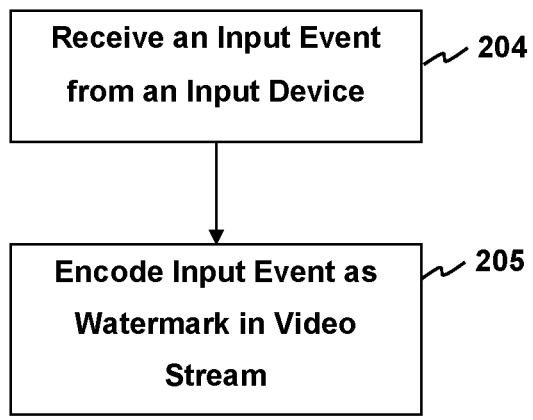
FIG. 2B depicts a block diagram of the method for synchronizing input feedback as a watermark in the video output stream according to aspects of the present disclosure.

FIG. 2B depicts the method for synchronizing input feedback as a watermark in the video output stream. The input event is received from an input device 204. The input event may be synchronized with specific events occurring in the video output stream or audio output stream. The input event is then encoded as a watermark in the video stream 205 while maintaining the synchronization. For example a keypress may be encoded in the video output stream before the movement in the video output stream e.g. movement of an avatar in a videogame, or an increase in the amplitude of the output audio stream. The watermark may be located without limitation, in the alpha channel, screen location or at a transparency where it not viewable.

Figure 2C:
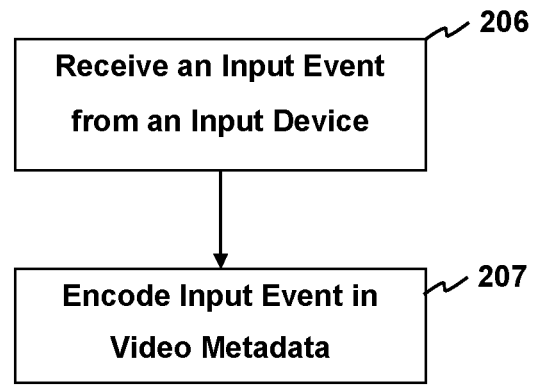
FIG. 2C shows a block diagram of the method for synchronizing input feedback as metadata in the video stream according to aspects of the present disclosure.

FIG. 2C shows the method for synchronizing input feedback as metadata in the video stream. As before, synchronized input events are received from an input device 206. The synchronized input events are then encoded synchronously with the video stream in the metadata of the video stream. The metadata may be a header in for each frame of the video stream, supplementary enhancement information or the like. When encoding an input event in the video output stream the rate of input events encoded within the output stream is locked to the frame rate of the video stream. As such, the rate of encoded inputs may be limited to 60 to 120 Hz, which are typical frame rates for video streams. Encoding inputs into the audio stream, by contrast, is less limited, as the sample rate of audio streams is much higher than that of video.

Machine Learning Improvement

Generally, a large amount of training data is required to train a machine learning system, such as a NN, to test software. A key component of software testing is ensuring that the input events correspond to proper software behavior and do not result in crashes or other adverse events that are deleterious to the user experience. As discussed above, current training methods for software testing NNs require testers to perform testing protocols while the NN is learning. This live testing data is used as a labeled dataset. Testing must be performed live as currently there is no easy way of providing synchronized input event information in software environments that are not configured to provide such information to NNs. Such software environments include videogames and user interfaces.

Figure 3:
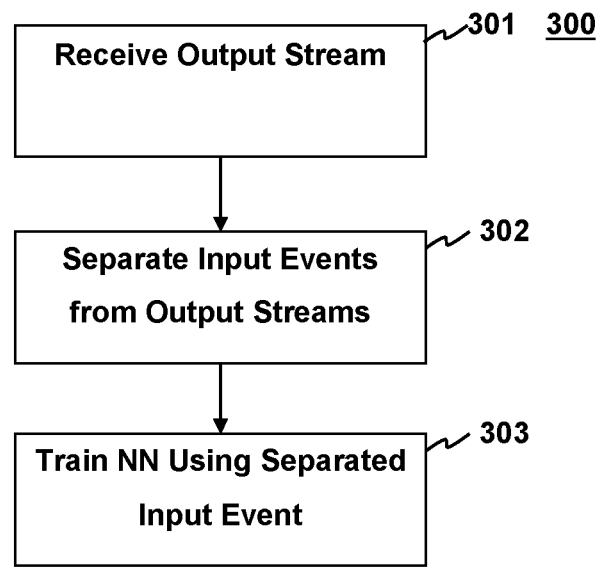
FIG. 3 depicts a block diagram of the method for using the output stream with encoded input events for machine learning according to aspects of the present disclosure.

According to aspects of the present disclosure, an input feedback mechanism may improve training of Neural Networks (NN) by providing input event information synchronized to specific events occurring within the audio output stream or video output stream of the system. The follow diagram shown in FIG. 3 depicts a method for using the output stream with encoded input events to improve NN training. The method begins with receiving an output stream that has synchronized input events encoded within the stream 301. The received output stream is split and a filter is applied to one of the split output streams to separate the input event from the actual output 302. In some implementations a NN may be trained to separate the input events from the output stream. Alternatively, a decoder application may pull the input events and feed them to the NN separately. In some implementations, the output stream may be duplicated and a low pass filter applied to one duplicate output stream and a high pass filter may be applied to the other duplicate output stream. In another implementation, the channels of the output stream may be split separating the alpha channel of the output stream from the other channels. In some implementations, frame meta-data may be separated from the video data.

Once the encoded input event is separated the from the output stream the NN can be trained using the encoded input event to represent a real input event 303. This method is advantageous because the encoded input event is synchronized with a specific event. This synchronization may be between events in the output stream or events in a different output stream than the output stream comprising the encoded input events. For example and without limitation, the synchronization may between an input event encoded as a tone in the audio stream and the activation of a user interface element in a video stream. Maintenance of this synchronization in an easy to access medium such as an output stream improves training of NN because it allows training with recorded data sets without major changes to the configuration of host systems. As used herein, the term "host system" refers to the device on which the output streams are reproduced and the NN is trained. By way of example, and not by way of limitation, the NN may be trained for software testing according to the methods discussed below.

Machine Learning Training

The neural networks, deep learning or other machine learning that implement the software testing may include one or more of several different types of neural networks and may have many different layers. By way of example and not by way of limitation neural networks may include one or more of convolutional neural networks (CNN), recurrent neural networks (RNN) and/or dynamic neural networks (DNN).

FIG. 5A depicts the basic form of an RNN having a layer of nodes 520, each of which is characterized by an activation function S, one input weight U, a recurrent hidden node transition weight W, and an output transition weight V. The activation function S may be any non-linear function known in the art and is not limited to the (hyperbolic tangent (tanh) function. For example, the activation function S may be a Sigmoid or ReLu function. Unlike other types of neural networks, RNNs have one set of activation functions and weights for the entire layer. As shown in FIG. 5B, the RNN may be considered as a series of nodes 520 having the same activation function moving through time T and T+1. Thus, the RNN maintains historical information by feeding the result from a previous time T to a current time T+1.

There are a number of ways in which the weights, U, W, V may be configured. The input weight U, for example, may be applied based on video pixel values, sound sample values, input event values or similar. The weights for these different inputs could be stored in a lookup table and applied as needed. There could be default values that the system applies initially. These may then be modified manually by the user or automatically by machine learning.

In some embodiments, a convolutional RNN (CRNN) may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

FIG. 5C depicts an example layout of a convolution neural network such as a CRNN according to aspects of the present disclosure. In this depiction, the convolution neural network is generated for an image 532 with a size of 4 units in height and 4 units in width giving a total area of 16 units. The depicted convolutional neural network has a filter 533 size of 2 units in height and 2 units in width with a skip value of 1 and a channel 536 of size 9. For clarity in FIG. 5C only the connections 534 between the first column of channels and their filter windows is depicted. Aspects of the present disclosure, however, are not limited to such implementations. According to aspects of the present disclosure, the convolutional neural network that implement software testing 529 may have any number of additional neural network node layers 531 and may include such layer types as additional convolutional layers, fully connected layers, pooling layers, max pooling layers, local contrast normalization layers, etc. of any size.

Figure 5D:
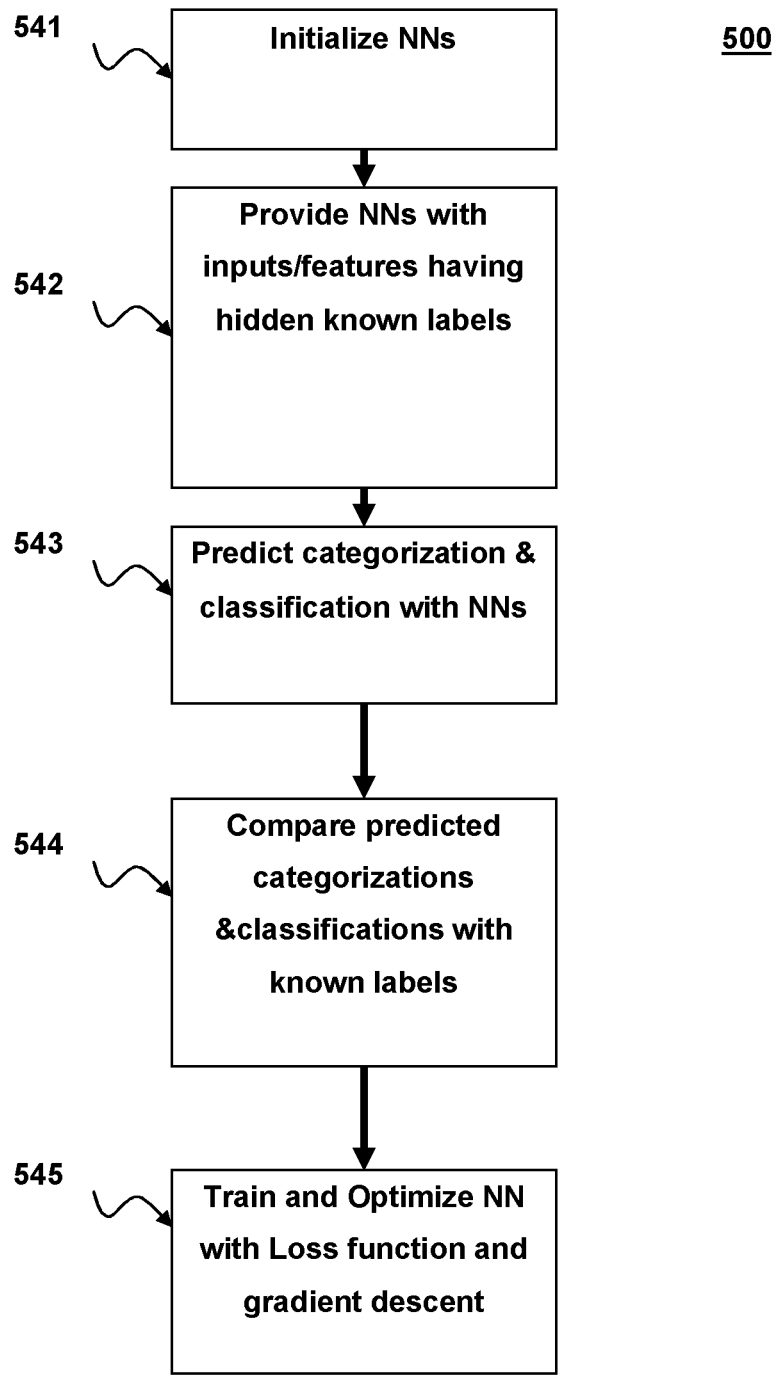
FIG. 5D is a block diagram of a method for training a neural network in a system having synchronized input feedback according to aspects of the present disclosure.

As seen in FIG. 5D Training a neural network (NN) begins with initialization of the weights of the NN 541. In general, the initial weights should be distributed randomly. For example, an NN with a tanh activation function should have random values distributed between $$-\frac{1}{\sqrt{n}} \text{ and } \frac{1}{\sqrt{n}},$$

where n is the number of inputs to the node.

After initialization the activation function and an optimizer are defined. The NN is then provided with a feature or input dataset 542. In some implementations, the software testing NN may be provided with feature vectors that correspond to inputs having known labeling. The NN then predicts a label or classification for the feature or input 543. The predicted label or class is compared to the known label or class (also known as ground truth) and a loss function measures the total error between the predictions and ground truth over all the training samples 544. By way of example and not by way of limitation the loss function may be a cross entropy loss function, quadratic cost, triplet contrastive function, exponential cost, etc. Multiple different loss functions may be used depending on the purpose. The NN is then optimized and trained, using the result of the loss function and using known methods of training for neural networks such as backpropagation with stochastic gradient descent etc. 545. In each training epoch, the optimizer tries to choose the model parameters (i.e., weights) that minimize the training loss function (i.e. total error). Data is partitioned into training, validation, and test samples.

During training, the Optimizer minimizes the loss function on the training samples. After each training epoch, the mode is evaluated on the validation sample by computing the validation loss and accuracy. If there is no significant change, training may stop and the resulting trained model may be used to predict the labels of the test data.

Thus, the software testing neural network may be trained from audio, video and encoded input event streams having known labels or classifications to identify and classify anomalous software activity by minimizing the cross entropy loss given known target labels.

Implementations

Figure 6:
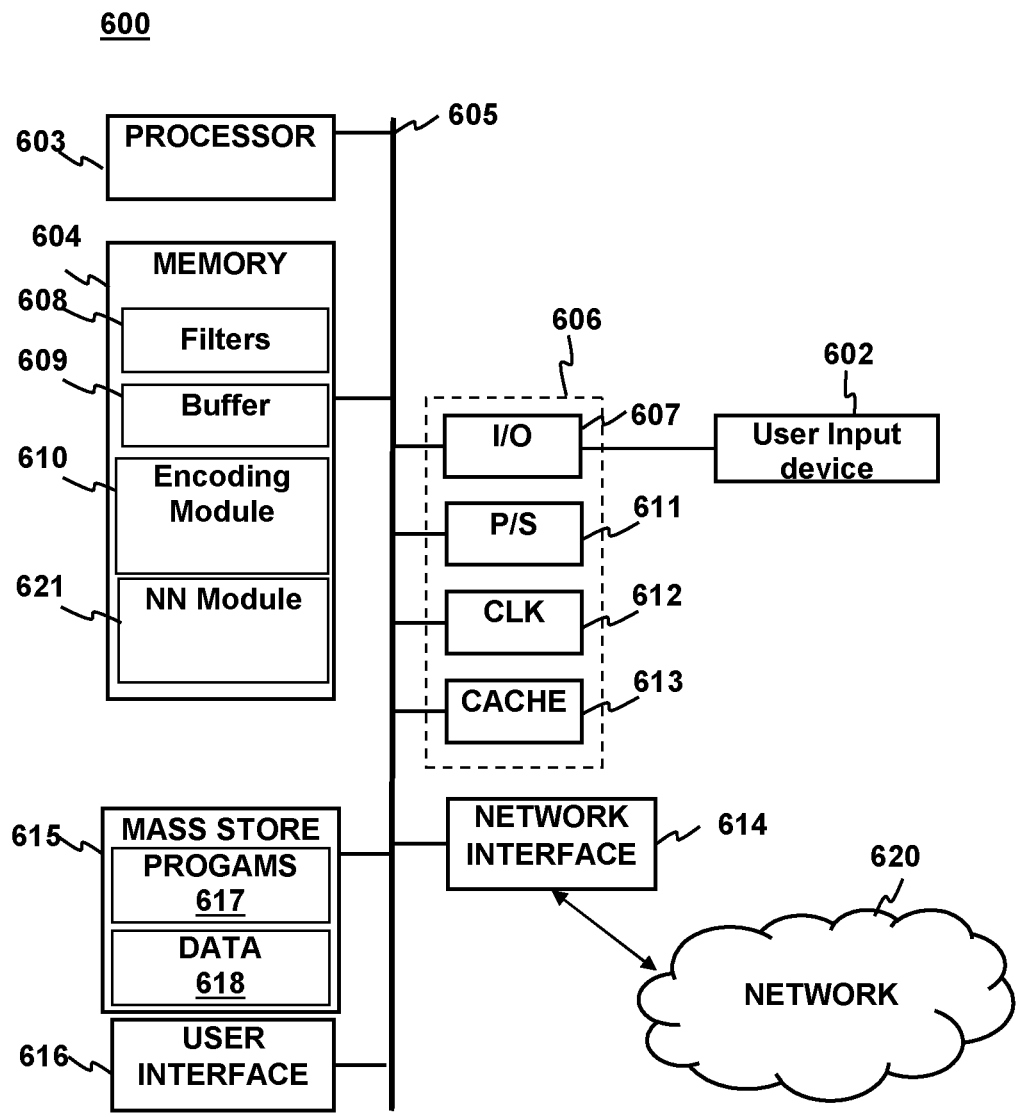
FIG. 6 depicts a block diagram of a system implementing synchronized input feedback with Neural Networks according to aspects of the present disclosure

FIG. 6 depicts a system for providing synchronized input feedback according to aspects of the present disclosure. The system may include a computing device 600 coupled to a user input device 602. The user input device 602 may be a controller, touch screen, microphone, keyboard, mouse, joystick or other similar devices.

The computing device 600 may include one or more processor units 603, which may be configured according to well-known architectures, such as, e.g., single-core, dual-core, quad-core, multi-core, processor-coprocessor, cell processor, and the like. The computing device may also include one or more memory units 604 (e.g., random access memory (RAM), dynamic random access memory (DRAM), read-only memory (ROM), and the like).

The processor unit 603 may execute one or more programs, portions of which may be stored in the memory 604 and the processor 603 may be operatively coupled to the memory, e.g., by accessing the memory via a data bus 605. The programs may be configured to implement filters 608 to a separate input event from an output stream. Additionally the memory 604 may contain programs that implement training of a NN 621. The memory 604 may also contain software modules such as the encoding module 610, which implements encoding an input event from a user input device 602 into an output stream. The output stream may be generated by execution of programs 617 in the mass store 615 or received from the network 620 and may be held in a buffer in memory 604 before or after encoding an input event.

The overall structure and probabilities of the NNs may also be stored as data 618 in the Mass Store 615. The processor unit 603 is further configured to execute one or more programs 617 stored in the mass store 615 or in memory 604 which cause processor to carry out the method 100 of encoding input events from an input device 602 into an output stream 610. Additionally the processor unit 604 may be configured to carry out the method for training a NN according to methods 300 and 500 discussed above. The system may generate Neural Networks as part of the NN training process. These Neural Networks may be stored in memory 604 in the sound categorization NN module 621. Completed NNs may be stored in memory 604 or as data 618 in the mass store 615. The programs 617 (or portions thereof) may also be configured, e.g., by appropriate programming, to apply appropriate filters 608 to output streams to generate encoded input events and a separate output stream, train a NN 621 with an encoded input event and encode input events into output streams 610 in a synchronized fashion.

The computing device 600 may also include well-known support circuits, such as input/output (I/O) 607, circuits, power supplies (P/S) 611, a clock (CLK) 612, and cache 613, which may communicate with other components of the system, e.g., via the bus 605. The computing device may include a network interface 614. The processor unit 603 and network interface 614 may be configured to implement a local area network (LAN) or personal area network (PAN), via a suitable network protocol, e.g., Bluetooth, for a PAN. The computing device may optionally include a mass storage device 615 such as a disk drive, CD-ROM drive, tape drive, flash memory, or the like, and the mass storage device may store programs and/or data. The computing device may also include a user interface 616 to facilitate interaction between the system and a user. The user interface may include a monitor, Television screen, speakers, headphones or other devices that communicate information to the user.

The computing device 600 may include a network interface 614 to facilitate communication via an electronic communications network 620. The network interface 614 may be configured to implement wired or wireless communication over local area networks and wide area networks such as the Internet. The device 600 may send and receive data and/or requests for files via one or more message packets over the network 620. Message packets sent over the network 620 may temporarily be stored in a buffer 609 in memory 604. An output stream may be received over the network 620 or generated from programs 617 locally.

While the above is a complete description of the preferred embodiment of the present disclosure, it is possible to use various alternatives, modifications and equivalents. It is to be understood that the above description is intended to be illustrative, and not restrictive. For example, while the flow diagrams in the figures show a particular order of operations performed by certain embodiments of the disclosure, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. The scope of the disclosure should therefore be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for providing synchronized input feedback:
   a) encoding one or more input events in an output stream, wherein:
      the output stream includes a video stream;
      one or more of the one or more input events are encoded as a watermark in an alpha channel over the video stream;
      the encoding of the one or more input events is synchronized to one or more subsequent specific events occurring within a software environment;
      the one or more input events include a control input that precedes one or more of the one or more subsequent specific events;
      the encoding of the one or more input events is synchronized to the one or more subsequent specific events occurring on a remote device over a network; and
      the one or more input events are encoded synchronously with the video stream or an audio stream having the one or more subsequent specific events occurring therein; and
   b) storing the output stream or reproducing the output stream through an output device, wherein:
      the one or more encoded input events in the output stream is imperceptible to a user when reproduced through the output device; and
      the one or more encoded input events in the reproduced output stream are decodable for use by one or more neural networks.

2. The method of claim 1, wherein the output stream includes the audio stream.

3. The method of claim 2 wherein the one or more input events is encoded into the audio stream as an infrasonic tone.

4. The method of claim 2 wherein one or more of the one or more input events are encoded into the audio stream as an ultrasonic tone.

5. The method of claim 1 wherein one or more of the one or more input events are encoded as metadata in the video stream.

6. The method of claim 5 wherein the metadata is supplemental enhancement information for each video frame.

7. The method of claim 1 wherein the output stream comprises a series of output events and the encoding of the one or more input events is synchronized with the series of output events.

8. The method of claim 1 wherein the encoding of the one or more input events are synchronized to one or more events occurring within a videogame.

9. The method of claim 1, wherein the control input is a key press.

10. The method of claim 1, wherein the control input is a joystick control input.

11. The method of claim 1, wherein the control input is a steering wheel control input.

12. The method of claim 1, wherein the control input is an analog joy pad input.

13. The method of claim 1, wherein the control input is a potentiometer input.

14. The method of claim 1, further comprising, filtering the output stream of the one or more encoded input events to separate the one or more encoded input events from the output stream.

15. The method of claim 14, further comprising providing the output stream and the one or more encoded input events as inputs to the one or more neural networks trained to associate the one or more encoded input events with the one or more subsequent specific events.

16. The method of claim 1 wherein the one or more input events are configured to cause the one or more subsequent specific events.

17. A non-transitory computer readable medium computer-readable instructions embedded thereon that when executed by a computer cause the computer to enact a method comprising:
   a) encoding one or more input events in an output stream, wherein:
      the output stream includes a video stream;
      one or more of the one or more input events are encoded as a watermark in an alpha channel over the video stream;
      the encoding of the one or more input events is synchronized to one or more subsequent specific events occurring within a software environment on a remote device over a network;
      the one or more input events include a control input that precedes one or more of the one or more subsequent specific events;
      the encoding of the one or more input events is synchronized to the one or more subsequent specific events; and
      the one or more input events are encoded synchronously with the video stream or an audio stream having the one or more subsequent specific events occurring therein; and
   b) storing the output stream or reproducing the output stream through an output device whereby the one or more encoded input events in the output stream are undetectable to a user when reproduced through the output device, wherein the one or more encoded input events in the reproduced output stream are decodable for use by one or more neural networks.

18. A system comprising:
   a processor;
   memory;
   non-transitory instruction in the memory that when executed cause the processor to enact a method comprising:
   a) encoding one or more input events in an output stream, wherein:
      the output stream includes a video stream;

one or more of the one or more input events are encoded as a watermark in an alpha channel over the video stream;
the encoding of the one or more input events are synchronized to one or more subsequent specific events occurring within a software environment on a remote device over a network;
the one or more input events include a control input that precedes one or more of the one or more subsequent specific events;
the encoding of the one or more input events is synchronized to the one or more subsequent specific events; and
the one or more input events are encoded synchronously with the video stream or an audio stream having the one or more subsequent specific events occurring therein; and b) storing the output stream or reproducing the output stream through an output device whereby the one or more encoded input events in the output stream are undetectable to a user when reproduced through the output device, wherein the one or more encoded input events in the reproduced output stream are decodable for use by one or more neural networks.

19. A method for improved machine learning training comprising;
a) receiving an output stream comprising one or more encoded input events that include a control input that precedes one or more subsequent specific events occurring within a software environment on a remote device over a network, wherein:
the output stream includes a video stream;
one or more of the one or more input events are encoded as a watermark in an alpha channel over the video stream;
the one or more encoded input events are undetectable to a user;
the one or more encoded input events in the output stream are decodable for use by one or more neural networks;
the encoding of the one or more input events is synchronized to the one or more subsequent specific events; and
the one or more input events are encoded synchronously with the video stream or an audio stream having the one or more subsequent specific events occurring therein;

b) filtering the audio stream or video stream to recover the one or more encoded input events, wherein the one or more encoded input events are synchronized to one or more of the one or more subsequent specific events occurring in the software environment; and c) training a neural network to associate the one or more encoded input events with the one or more subsequent specific events.

20. A non-transitory computer-readable medium having an output stream embedded thereon, the output stream comprising:
one or more input events encoded into the output stream, wherein:
the output stream includes a video stream;
one or more of the one or more input events are encoded as a watermark in an alpha channel over the video stream;
the one or more input events include a control input that precedes one or more subsequent specific events occurring within a software environment on a remote device over a network;
the one or more encoded input events are synchronized to one or more of the one or more subsequent specific events occurring in the software environment;
the encoding of the one or more input events is synchronized to the one or more subsequent specific events;
the one or more input events are encoded synchronously with the video stream or an audio stream having the one or more subsequent specific events occurring therein;
the one or more encoded input events are configured to be imperceptible to a user when the output stream reproduced through an output device; and
the one or more encoded input events in the output stream are decodable for use by one or more neural networks when the output stream is reproduced by the output device.

* * * * *